May 21, 1957  J. GERENTES  2,793,305
PORTABLE ELECTRIC MACHINE HAVING A ROTATING TOOL
Filed Jan. 11, 1955  2 Sheets-Sheet 1
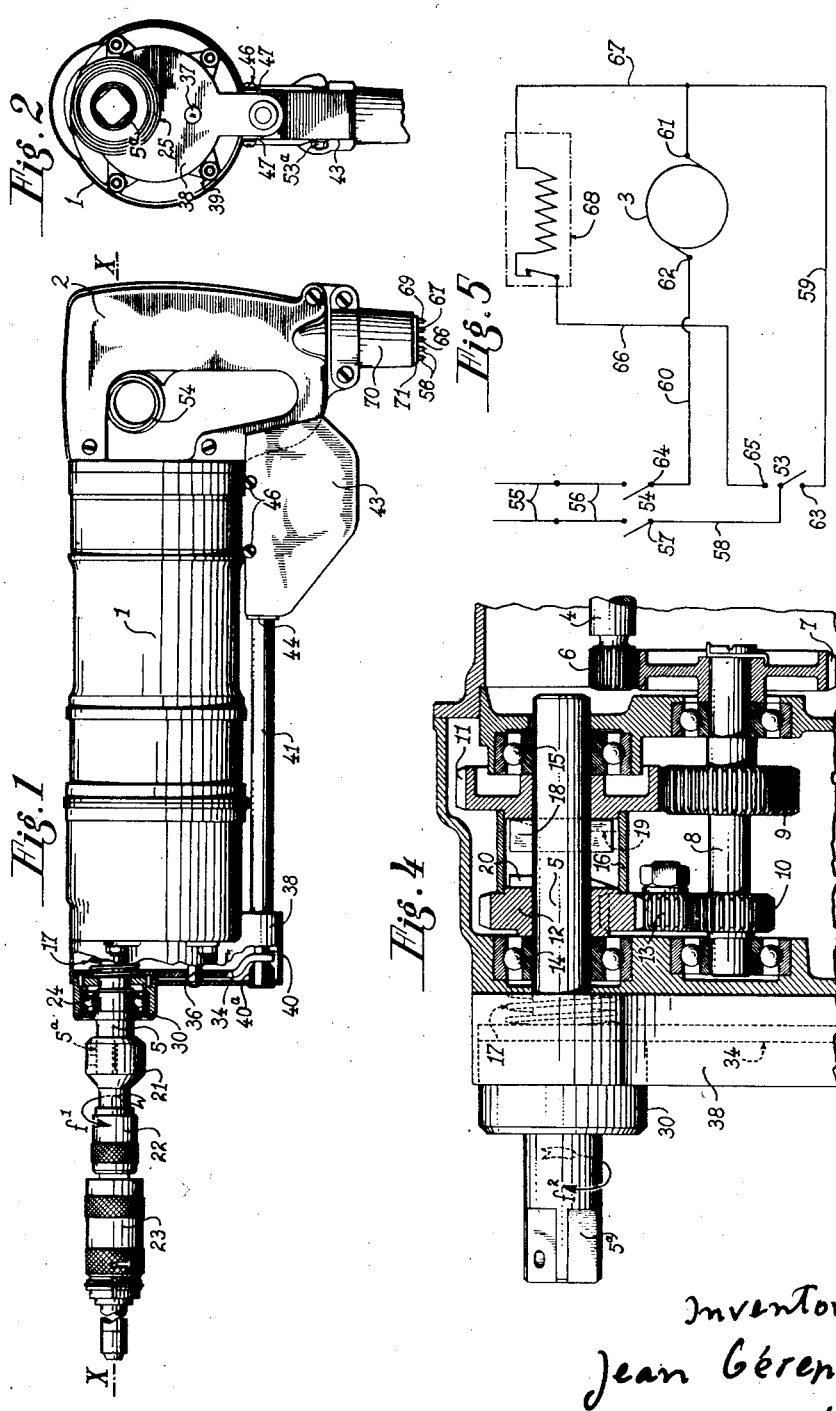

May 21, 1957  J. GERENTES  2,793,305
PORTABLE ELECTRIC MACHINE HAVING A ROTATING TOOL
Filed Jan. 11, 1955  2 Sheets-Sheet 2
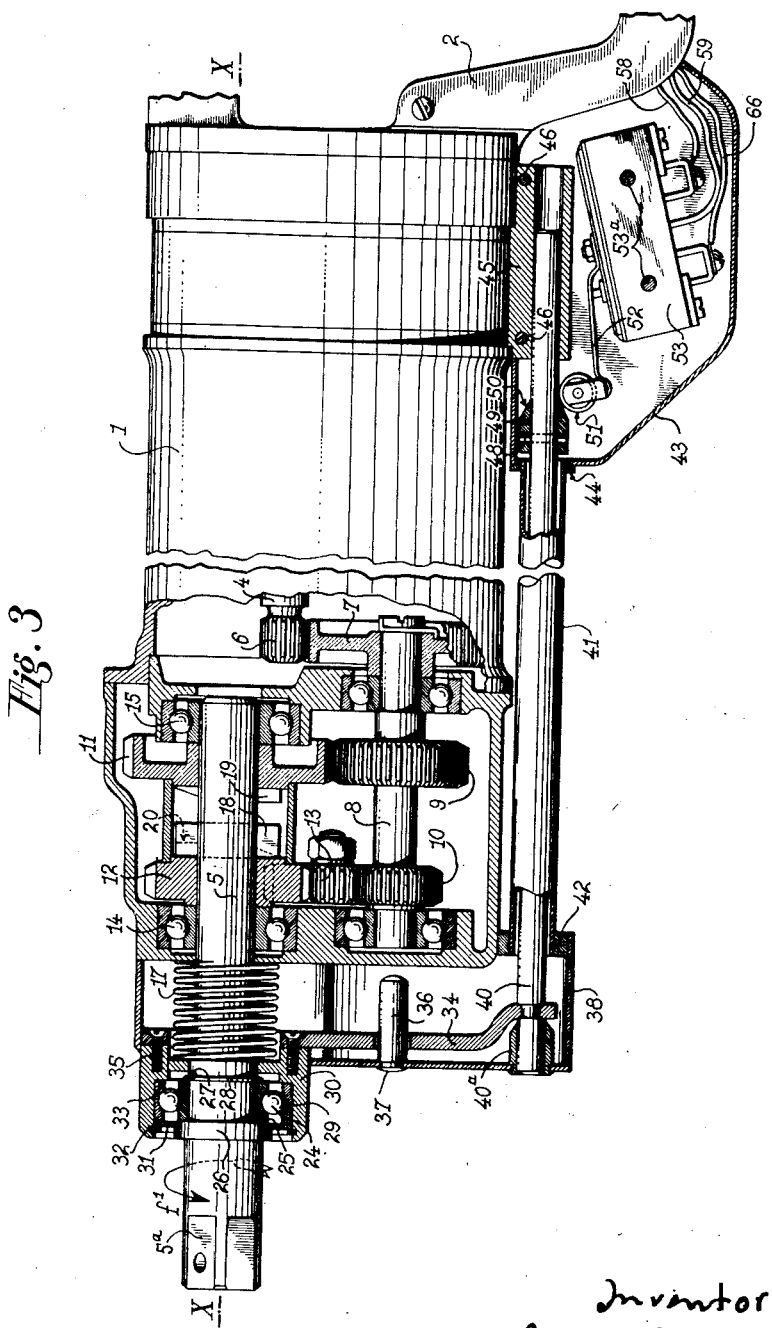

United States Patent Office 2,793,305
Patented May 21, 1957

2,793,305

PORTABLE ELECTRIC MACHINE HAVING A ROTATING TOOL

Jean Gérentès, Saint-Etienne, France, assignor to Societe des Brevets Wagner, Paris, France, a French body corporate Application January 11, 1955, Serial No. 481,231

Claims priority, application France April 27, 1954

3 Claims. (Cl. 310—50)

The present invention relates to portable electric machines having a rotating tool which are of use in particular in tube beading, drilling, tapping, and similar operations. These machines are of the type in which an electric motor enclosed in the housing of the machine is connected by a reversing device to a tool-carrying spindle which is movable axially between two extreme positions under the opposing actions of a return spring and the thrust exerted by the operator in the course of performing the operation, the axial displacement of this spindle causing a change in the direction in which it is driven in rotation.

It is known that for some operations, as for example beading smal tubes and tapping small diameter holes, it is often necessary to limit the maximum torque developed by the tool, that is its power. This limitation is necessary, in the case of beaders, to avoid over-expanding the tube and, in the case of tapping, to avoid breaking the taps.

The torque is limited either by a frictional action exerting a given torque or by a limitation of the maximum electric power consumed, this limitation being obtained by stopping the machine.

In this second solution, when starting up, the measuring and release apparatus for stopping the machine must be out of circuit. It is already known to utilize, when starting up, relays which short out this measuring and release apparatus, or alternatively a switch which brings into action the operating circuit during normal work.

Now although it is easy to install a commutator on large fixed machines, this is not so for the small portable machines of the above-mentioned type to which the invention is applicable, for in this case the size or weight of the machine must be kept to a minimum. It is necessary to have a device which is not space consuming and yet robust.

The invention has for object to provide a portable electric machine having a rotating tool of the above-mentioned type which is so improved as to meet these requirements. In this machine the commutator or switch adapted to short out, when starting up, the usual measuring and release apparatus for stopping the machine when a given maximum power has been reached is housed in the handle or grip of the machine and the operating member thereof is connected to the rotating spindle so that the axial movements of this spindle under the opposing actions of the elastic return device and the thrust exerted by the operator during the operation assures the desired switching, said apparatus being shorted out when the spindle is urged by said elastic device into one of its extreme positions.

In this arrangement the various conductors unite in the handle in the form of a single cable and the switching is automatically achieved when a certain force is applied on the machine.

According to a preferred embodiment, the connection of the rotating spindle to the operating member of the commutator or switch comprises a rod arrangement disposed along the housing of the machine.

Further features and advantages of the invention will be apparent from the ensuing description.

In the accompanying drawings, given merely by way of example.

Fig. 1 is an elevational view on a small scale and with parts cut away, of a machine embodying the invention shown in its starting-up condition;

Fig. 2 is a front end view of the machine;

Fig. 3 is a partial sectional view of the machine on a larger scale;

Fig. 4 is a partial sectional view similar to that shown in Fig. 3 of the part of this machine forming the machine reversing device illustrated in its operative position, and Fig. 5 is a diagram of the electric circuit.

In the illustrated embodiment, the machine is of the known type comprising a housing 1 which consists of several parts disposed end to end and is provided at the rear with a handle or grip 2. This housing contains an electric motor 3 (Fig. 5). Figs. 1, 3, and 4 show the end of the output shaft 4 of this motor. This shaft is connected to an output spindle 5 by a gear reversing device.

Rigidly secured to the shaft 4 is a gear pinion 6 which drives through a gear 7 an intermediate shaft 8 on which are keyed two gears 9 and 10. The latter are permanently engaged with two driven gears 11 and 12 which are freely rotatable on the spindle 5, there being a direct connection between the gears 9 and 11 whereas between the gears 10 and 12 there is interposed an idler gear 13 for reversing the direction of rotation (Figs. 3 and 4).

The spindle 5 is rotatably mounted in anti-friction bearings 14 and 15 and is capable of sliding axially in these bearings and in the gears 11 and 12 (spaced apart by a spacer member 16), between the extreme position shown in Figs. 1 and 3, where it is held by a spring 17, and that shown in Fig. 4. This latter position is obtained when the operator bears against the machine and the spindle 5 is applied against the piece to be machined, through the medium of the tool carried by this spindle.

In these extreme positions, the spindle is caused to engage the gear 12 (Fig. 3) or the gear 11 (Fig. 4), owing to a key 18 carried by this spindle which cooperates with lateral teeth 19 or 20 formed in the gear 11 or 12 respectively.

The positions of the machine parts shown in Figs. 1 and 3 correspond to the direction of rotation indicated by arrow $f^1$, when the machine is in condition to start up.

The positions of the machine parts shown in Fig. 4 correspond to the opposite direction of rotation, indicated by arrow $f^2$, when the machine is in its normal working condition.

The spindle 5 terminates in a square end 5ª on which is engaged a connection 21 to which is assembled, by means of a locking sleeve 22, the tool 23, in this case a tube beader.

According to the invention, the above-described unit of known type is completed in the following way:

On the spindle 5 between the spring 17 and the square end 5ª, is fixed a deep-groove anti-friction bearing (Fig. 3). Thus the latter participates in the axial movements of the spindle. To this end, the inner ring 25 of this bearing is held against a shoulder 26 formed on the spindle 5 by a split ring 27 engaged in an annular groove 28 also formed in the spindle 5.

The outer ring 29 of the anti-friction bearing is held in position in a cylindrical cage 30 which participates in the axial displacement of the spindle, this ring being held between a grease-retaining washer 31, held in position by a split ring 32, and a shoulder 33 formed in the cage 30. This shoulder is concentric with the axis XX of the spindle 5.

A strip or plate 34, through which freely passes the spindle 5, is secured by screws 35 to the cage 30, so that it participates with the latter and the anti-friction bearing, in the axial movements of the spindle. The spring 17 bears against the cage 30. The strip is guided in its translatory movements by a pin 36 (Figs. 1 and 3) which freely pass therethrough and is riveted at 37 to a protecting housing or case 38 which is attached by means of screws 39 to the front end of the housing 1.

At its end remote from the spindle 5, the strip 34 is assembled with a longitudinally extending rod 40 whose front end is slidable in a tube 40ª attached to the housing 38 (Figs. 1 and 3). This rod extends through a tube 41 which is parallel to the axis XX and lies adjacent the housing 1. The auxiliary front housing 38, to which this tube 41 is fixed at 42, is connected thereby to a rear case or cover 43 to which this tube is also fixed at 44. This case 43 is attached to the housing 1 near the handle 2.

The rod 40, which participates in the axial movements of the spindle 5, extends into this housing 43 and is guided therein in a member 45 attached by means of screws 46 between two lugs 47 formed on the housing 1 (Fig. 2).

Inside the case 43 and on the rod 40 is secured by means of a pin 48 a collar 49 forming a cam. The rear face 50 of the latter has a conical or similar shape and co-operates with a roller 51 carried by the movable operating member 52 of an electric control switch 53. This switch is of the microswitch type and is fixed in the case 43 by screws 53ª.

The collar 49 is so positioned on the rod 40 that it reverses the switch 53 when the spindle passes from the starting-up position shown in Figs. 1 and 3, where it is held by the spring 17, to the working or operating position shown in Fig. 4.

The machine includes in the known manner a tumbler switch 54 in the handle 2.

Referring now to Fig. 5, which shows the circuit diagram the supply 55 is connected by the two conductors 56 to the tumbler switch 54. One of the terminals 57 of this switch is connected to the movable operating member of the switch 53 by the conductor 58 disposed in the handle 2 and the case 43. Two other conductors 59 and 60 connect the terminals 61 and 62 of the motor to the stud 63 of the switch 53 and to the terminal 64 of the switch 54.

The other stud 65 of the switch and the terminal 61 of the motor are connected by two conductors 66 and 67 to the usual automatic measuring and stopping apparatus 68 which stops the motor when a pre-determined maximum torque has been reached.

Five conductors (conductors 56, 66, and 67 and the earthing conductor 69) issue from the handle 2 within a sheath 70 (Fig. 1) in the form of a cable 71.

The machine operates in the following manner:

When starting up the machine, no force is exerted by the operator on the handle 2 and the spindle 5 is urged to its forward position by the action of the spring 17. Thus the control switch 53 connects the motor 3 directly with the supply, the circuit being: the terminal 57 of the switch 54, the conductor 58, the stud 63, the conductor 59, the motor 3, the conductor 60 and the terminal 64. As soon as the switch 54 is closed, the motor starts up and the spindle and the tool are rotated in the direction of arrow $f^1$ (Fig. 1 and 3) through the gear train 6, 7, 10, 13, and 12.

In the normal operating position the tool 23 is introduced in the work piece and the operator bears against the handle 2 and exerts a force against the action of the spring 17 and the reaction of the work in progress. The spindle is urged into the housing 1 and passes from the position shown in Figs. 1 and 3 to that shown in Fig. 4.

As a result of this, the direction of rotation is reversed, the spindle 5 now being caused to rotate in the direction of arrow $f^2$ (Fig. 4) through the gear train 6, 7, 9, and 11. Furthermore, the control switch establishes the circuit connecting the elements 57, 58, 65, 66, measuring said stopping apparatus 68, 67, 61, motor 3, 62, 60, and 64.

The motor 3 is automatically stopped by the apparatus 68 when the maximum torque has been reached.

Although a specific embodiment of the invention has been described, it is to be understood that many changes and modifications may be made therein without departing from the spirit of the invention or the scope of the appended claims.

Thus, the unit comprising the auxiliary housing 38, the tube 41, and the case 43 may be cast in one piece with the housing 1 instead of being attached to the latter. The connection between the spindle 5 and the switch 53 could be disposed inside the housing 1.

Having now described my invention what I claim as new and desire to secure by Letters Patent is:

1. In a portable electric machine, for tube beading operations, tapping and like operations, of the type comprising a housing terminating in a rear handle, an electric motor in this housing, an electric switch disposed in the handle for controlling the power supply to the motor, and a rotatable tool-carrying spindle driven in rotation by the motor and capable of moving axially in the housing between an inoperative position and an operative position, this spindle being operatively connected to the switch so that the latter is automatically actuated by the axial movements of the spindle, connecting means connecting the latter to the switch, these connecting means being wholly outside the housing and comprising in combination: a case fixed to the front end of the housing; a cage axially movable in the case; a ball bearing whose outer ring is fixed in the cage and inner ring is rotatably mounted on said spindle but prevented from axial movement on the latter, whereby the cage is prevented from axial movement relative to the spindle; a rigid plate fixed to the cage transversely of the latter and disposed inside the case; a rod extending longitudinally of the housing and fixed at one end to the plate; guiding means for guiding the rod alongside the housing, and a cam carried by the other end of the rod and co-operable with said switch for actuating the latter in accordance with the axial movements of said spindle.

2. Machine as claimed in claim 1, wherein there is provided a cover for housing the switch, this cover being fixed to the housing and connected to the case by a tube which constitutes outside the housing said guiding means for the rod.

3. An accessory for a portable electric tool, the latter comprising a housing, a motor in the latter, a rotatable tool-carrying spindle which protrudes from the housing, is driven in rotation by the motor and is axially movable between a forward inoperative position and a rear operative position, said accessory being adaptable on the housing outside the latter, and comprising in combination: a case, a cover for a switch and a tube rigidly connecting the cover to the case, the cover and the case being so constructed and arranged as to be adaptable and attachable respectively to the rear end and front end of the housing outside the latter; a cage axially movable in the case; a ball bearing whose outer ring is fixed in the cage and whose inner ring is engaged on the spindle, means for holding said inner ring in position on the latter; a rigid plate fixed transversely of the cage inside the case; a rod extending longitudinally of the housing and fixed at one end to the plate, the rod being axially movable in said tube and extending into the cover at its other end; a cam carried by the last-mentioned end of the rod and disposed in the cover, an electric switch the movable member of which is operatively connected to the cam in such manner that its position depends on the position of the cage and the ball bearing in the case, this switch controlling the power supply to said motor.

References Cited in the file of this patent

UNITED STATES PATENTS

| | | |
|---|---|---|
| 1,449,908 | Guckin et al. | Mar. 27, 1923 |
| 2,521,479 | Rautter | Sept. 5, 1950 |
| 2,539,123 | Dudley | Jan. 23, 1951 |